(12) United States Patent
Chan (10) Patent No.: US 12,471,253 B2
(45) Date of Patent: Nov. 11, 2025

(54) HEAT DISSIPATION STRUCTURE AND ELECTRONIC DEVICE

(71) Applicant: Getac Technology Corporation, New Taipei (TW)

(72) Inventor: Hao-Wei Chan, Taipei (TW)

(73) Assignee: GETAC TECHNOLOGY CORPORATION, New Taipei (TW)

( * ) Notice: Subject to any disclaimer, the term of this patent is extended or adjusted under 35 U.S.C. 154(b) by 537 days.

(21) Appl. No.: 17/884,632

(22) Filed: Aug. 10, 2022

(65) Prior Publication Data

US 2024/0057295 A1 Feb. 15, 2024

(51) Int. Cl.
*H05K 7/20* (2006.01)
*G06F 1/20* (2006.01)

(52) U.S. Cl.
CPC ......... *H05K 7/20481* (2013.01); *G06F 1/203* (2013.01)

(58) Field of Classification Search
CPC ........ H05K 7/1007; H05K 7/10; H05K 1/117; H05K 7/20481; H05K 7/2039; G06F 1/203
See application file for complete search history.

(56) References Cited

U.S. PATENT DOCUMENTS

| | | | |
|---|---|---|---|
| 5,475,563 A | 12/1995 | Donahoe et al. | |
| 5,689,654 A | 11/1997 | Kikinis et al. | |
| 6,980,437 B2 * | 12/2005 | Bright | H04B 1/036 361/704 |
| 7,145,773 B2 * | 12/2006 | Shearman | H05K 7/20418 439/437 |
| 7,852,633 B2 * | 12/2010 | Ito | H05K 5/0286 439/485 |
| 8,535,787 B1 * | 9/2013 | Lima | B32B 27/06 428/458 |
| 8,879,267 B2 * | 11/2014 | Henry | H04L 12/6418 361/709 |
| 10,372,168 B1 | 8/2019 | He et al. | |
| 11,300,363 B2 | 4/2022 | Gupta et al. | |
| 2015/0146365 A1 | 5/2015 | Lin | |
| 2023/0314739 A1 * | 10/2023 | Wang | G02B 6/4239 398/135 |

FOREIGN PATENT DOCUMENTS

| | | |
|---|---|---|
| TW | M565425 U | 8/2018 |
| TW | I763212 B | 5/2022 |

* cited by examiner

*Primary Examiner* — Jayprakash N Gandhi
*Assistant Examiner* — Matthew Sinclair Muir
(74) *Attorney, Agent, or Firm* — troutman pepper locke; Tim Tingkang Xia, Esq.

(57) ABSTRACT

A heat dissipation structure includes a housing, a heat conduction sheet and a thin film. The housing includes a wall surface, which includes an accommodating groove, a supporting surface and an inclined surface. The accommodating groove is recessed on the supporting surface. The inclined surface is connected to the supporting surface, and is located on one side of the accommodating groove. The heat conduction sheet is accommodated in the accommodating groove, and a surface of the heat conduction sheet is in aligned with a surface of the supporting surface. The thin film covers the supporting surface, the heat conduction sheet and the inclined surface. An electronic device including the above housing and heat conduction sheet is further provided.

20 Claims, 6 Drawing Sheets

HEAT DISSIPATION STRUCTURE AND ELECTRONIC DEVICE

BACKGROUND OF THE INVENTION

Field of the Invention

The present application relates to an electronic device and an electronic device including a heat dissipation structure.

Description of the Prior Art

With the popularity of electronic devices, users have higher requirements on electronic devices. Thus, most electronic devices are equipped with expansion ports for a user to expand and connect to required electronic elements as needed. To enable a user to more easily expand and connect to an electronic element, an electronic element is usually configured to be connected by a pluggable means, thereby enabling a user to easily complete expansion or removal of the electronic element.

To ensure operation smoothness of pluggable electronic elements, a gap is reserved in a space in which a corresponding pluggable electronic element is assembled in an electronic device, ensuring that the pluggable electronic element can be smoothly plugged into the electronic device. However, once the pluggable electronic element is plugged into the electronic device, the gap around the pluggable electronic element becomes an air layer that is high in thermal resistance, and this leads to poor heat dissipation effects needing to be improved.

SUMMARY OF THE INVENTION

The present application provides a heat dissipation structure including a housing, a heat conduction sheet and a thin film. The housing includes a wall surface, which includes an accommodating groove, a supporting surface and an inclined surface. The accommodating groove is recessed on the supporting surface. The inclined surface is connected to the supporting surface, and is located on one side of the accommodating groove. The heat conduction sheet is accommodated in the accommodating groove, and a surface of the heat conduction sheet is in aligned with a surface of the supporting surface. The thin film covers the supporting surface, the heat conduction sheet and the inclined surface.

Thus, a pluggable heat source can directly dissipate heat through the heat conduction sheet after it is placed into the housing, hence enhancing heat dissipation effects. The inclined surface on the housing can guide the pluggable heat source to be placed into the housing. Moreover, the thin film on the housing can further assist the pluggable heat source to be inserted with minimal effort into the housing, and the thin film that extends and covers the inclined surface can further prevent the pluggable heat source from contacting an end portion of the thin film during a plugging/unplugging process, reducing the risks of the thin film being scooped up by the pluggable heat source and enhancing structural stability.

In some embodiments, the heat conduction sheet has a first thickness, the thin film has a second thickness, and the second thickness is 10% to 35% of the first thickness.

In some embodiments, the coefficient of friction of the thin film is less than the coefficient of friction of the heat conduction sheet.

In some embodiments, the coefficient of friction of the thin film is less than the coefficient of friction of the supporting surface.

In some embodiments, the thin film is made of polyethylene (PE) or polytetrafluoroethylene (PTFE).

In some embodiments, a direction perpendicular to the supporting surface is a first direction, the accommodating groove has a groove bottom surface, the inclined surface has a first end and a second end, the first end is connected to the support surface, and the second end is farther away from the support surface than the groove bottom surface in the first direction.

In some embodiments, the housing further has an interface, and the second end of the inclined surface is closer to the interface than the first end.

In some embodiments, a direction perpendicular to the first direction is a second direction, the supporting surface has a first length between the accommodating groove and the inclined surface in the second direction, the inclined surface has a second length between the first end and the second end, and the second length is more than the first length.

In some embodiments, an included angle at the first end between the supporting surface and the inclined surface is an obtuse angle.

In some embodiments, the wall surface further includes an extension surface which is connected to the inclined surface, and a slope of the extension surface is more than a slope of the inclined surface.

The present application further provides an electronic device including a housing, a heat conduction sheet, a thin film and a pluggable heat source. The housing includes a wall surface, which includes an accommodating groove, a supporting surface and an inclined surface. The accommodating groove is recessed on the supporting surface. The inclined surface is connected to the supporting surface, and is located on one side of the accommodating groove. The heat conduction sheet is accommodated in the accommodating groove, and a surface of the heat conduction sheet is in aligned with a surface of the supporting surface. The thin film covers the supporting surface, the heat conduction sheet and the inclined surface. The pluggable heat source is arranged on the thin film.

In some embodiments, the housing further has an interface, and the pluggable heat source is slidably arranged in the housing through the interface.

In some embodiments, the electronic device further includes a host, and the housing is arranged on a side surface of the host.

The present application further provides an electronic device including a housing, a heat conduction sheet and a pluggable heat source. The housing includes a wall surface, which includes an accommodating groove, a supporting surface and an inclined surface. The accommodating groove is recessed on the supporting surface. The inclined surface is connected to the supporting surface, and is located on one side of the accommodating groove. The heat conduction sheet is accommodated in the accommodating groove, and a surface of the heat conduction sheet is in aligned with a surface of the supporting surface. The pluggable heat source is arranged on the supporting surface and the heat conduction sheet.

In some embodiments, the housing further includes a sidewall which is arranged around a periphery of the wall surface, and the sidewall and one side of the wall surface jointly define an accommodating space for insertion of the pluggable heat source.

In some embodiments, the sidewall has an interface in communication with the accommodating space.

In some embodiments, the inclined surface has a first end and a second end opposite to each other, the first end is connected to the supporting surface, and the second end is away from the supporting surface and faces the interface.

DETAILED DESCRIPTION OF THE EMBODIMENTS

Figure 1:
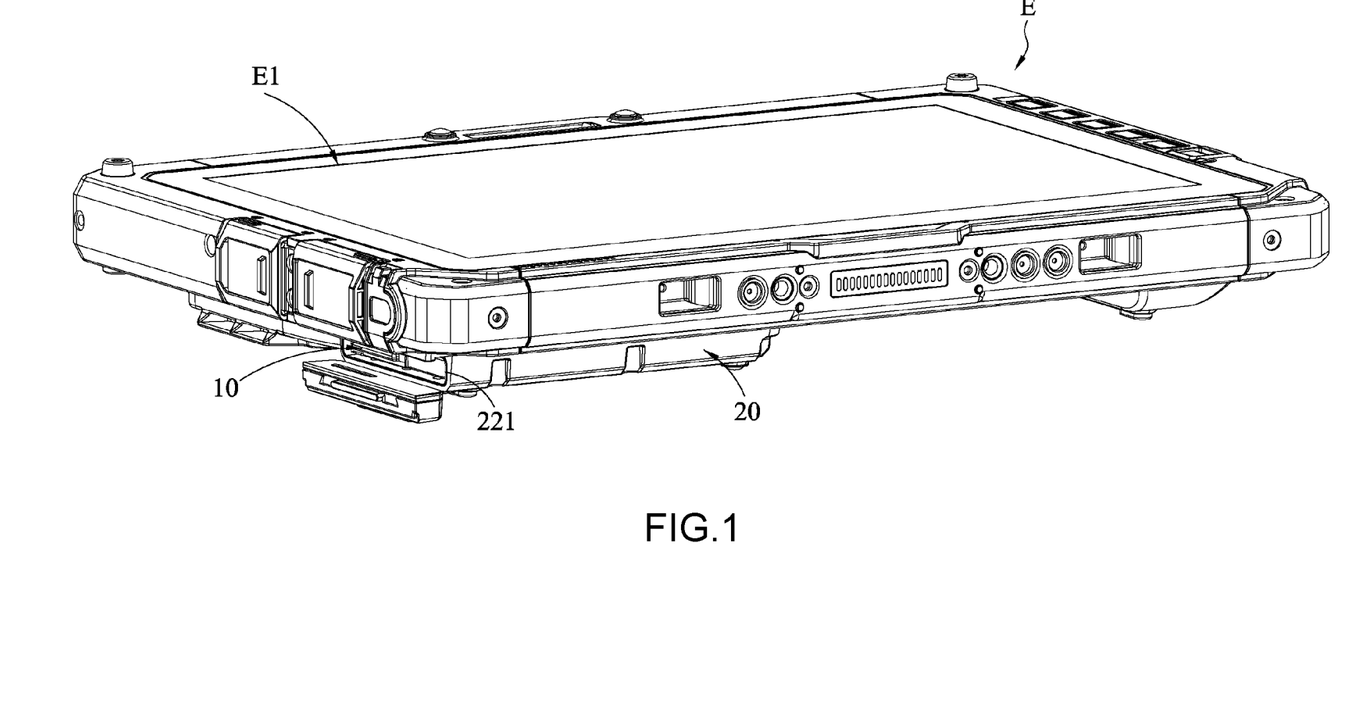
FIG. 1 is an appearance schematic diagram of an electronic device having a heat dissipation structure according to an embodiment of the present application.
Figure 2:
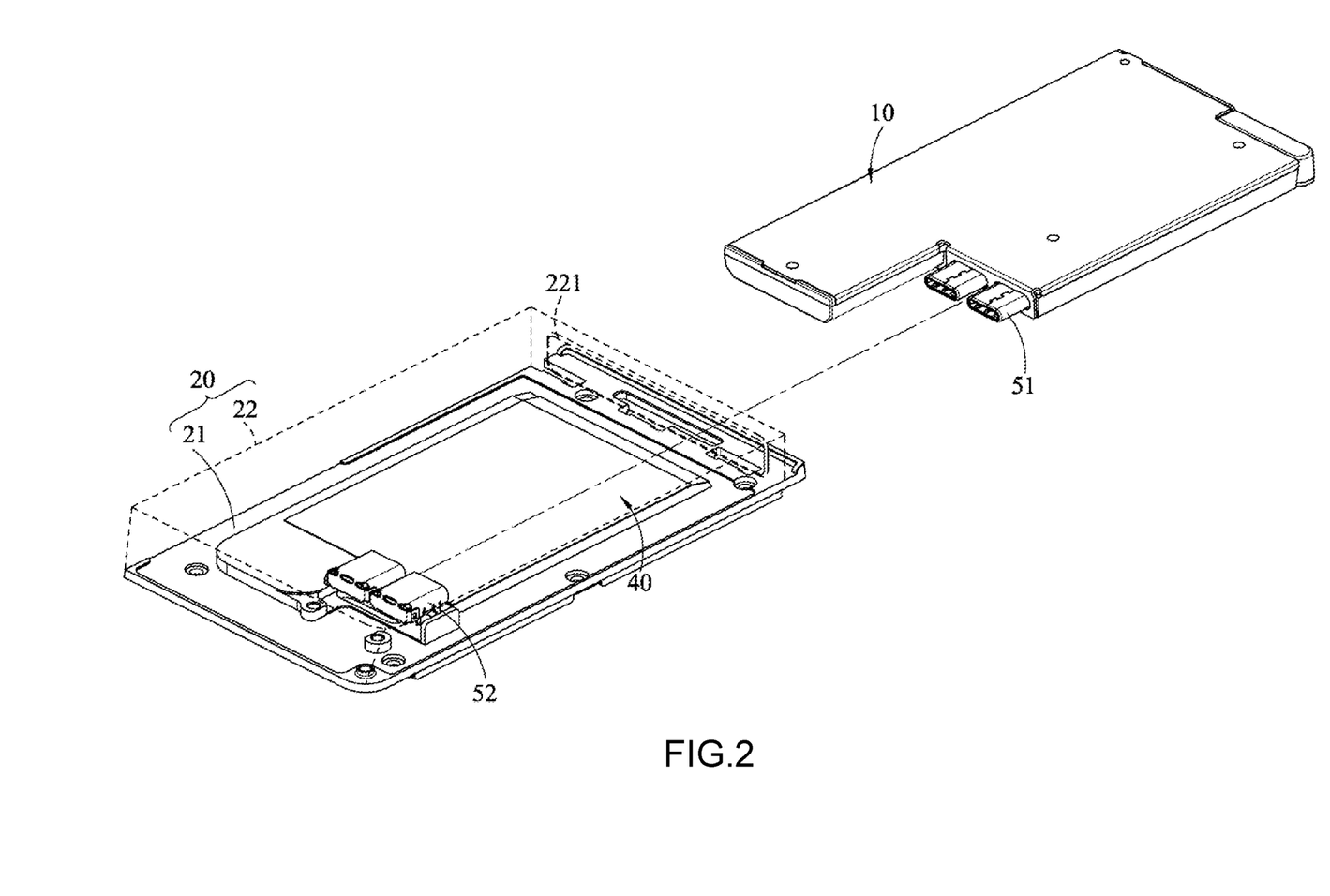
FIG. 2 is a three-dimensional structural schematic diagram of a heat dissipation structure used in coordination with a pluggable heat source according to an embodiment of the present application.
Figure 3:
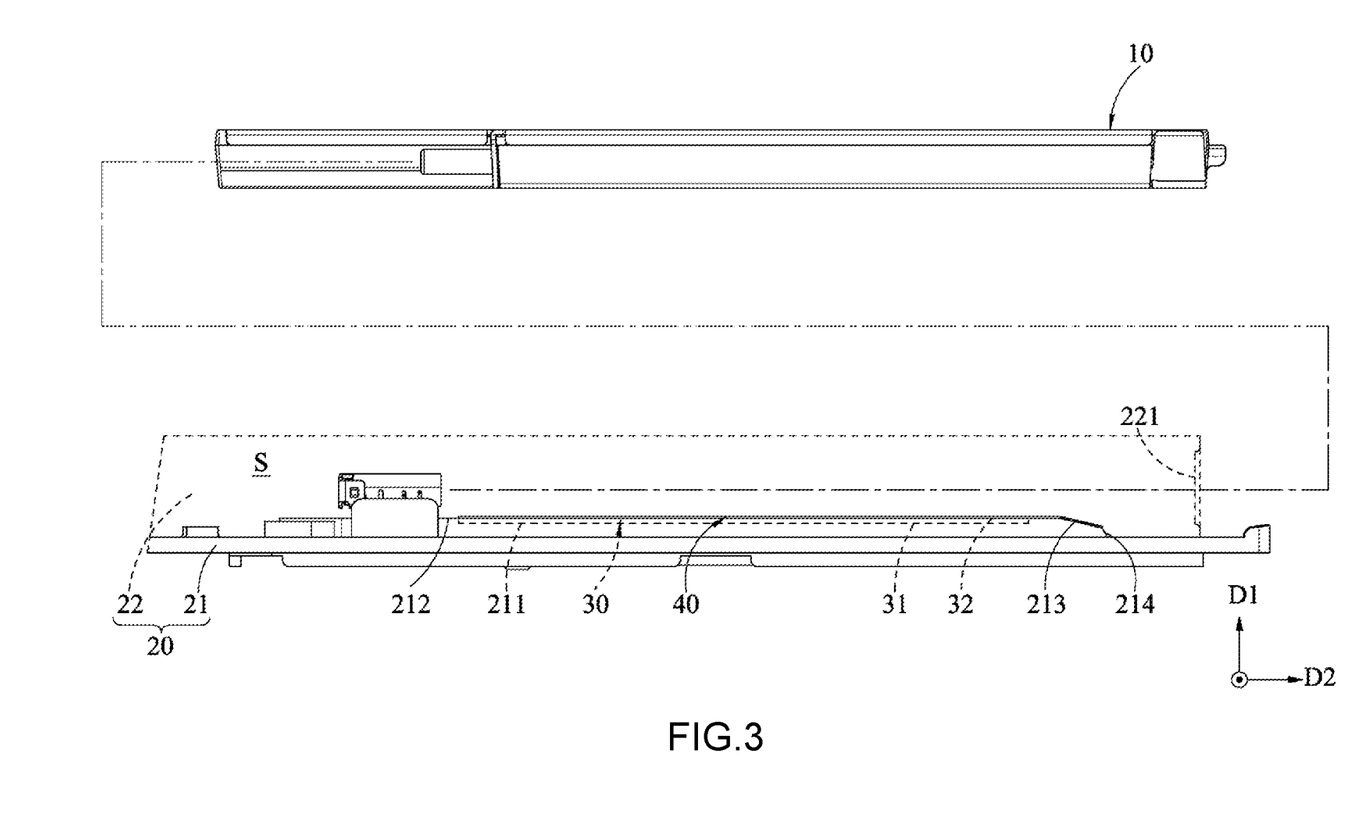
FIG. 3 is an exploded planar structural schematic diagram of a heat dissipation structure used in coordination with a pluggable heat source according to an embodiment of the present application.
Figure 4:
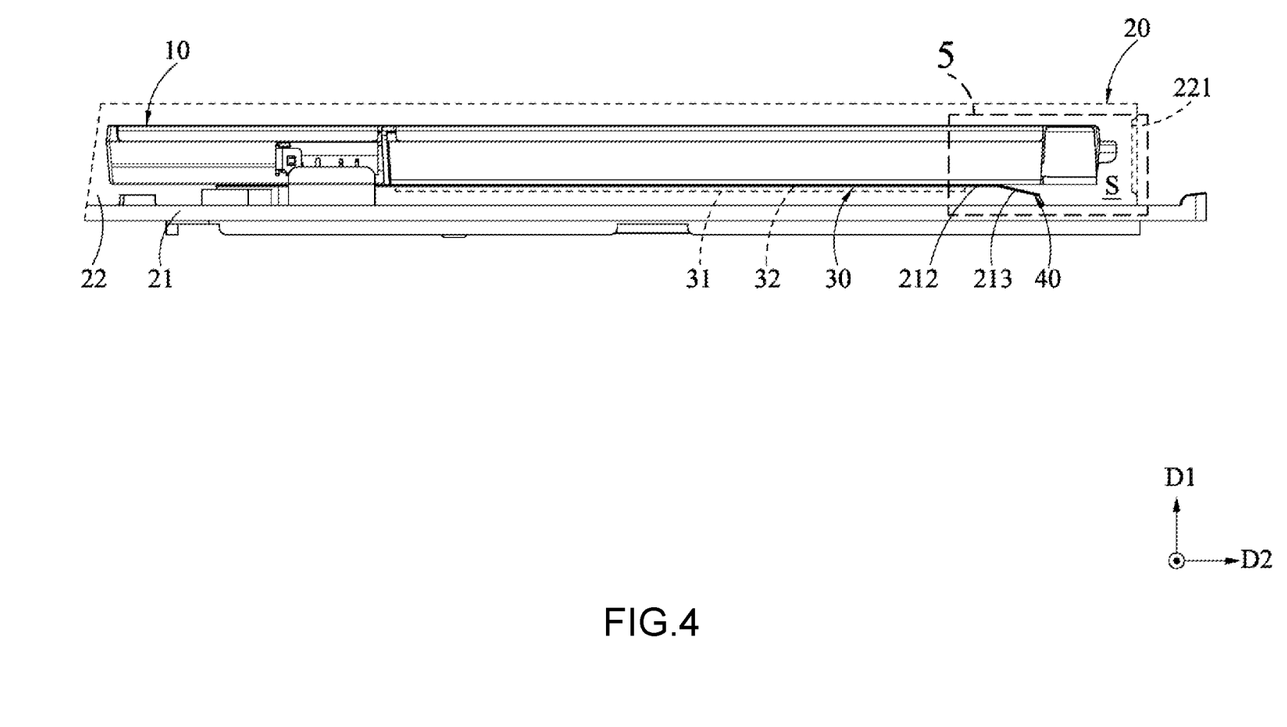
FIG. 4 is a planar assembly structural schematic diagram of a heat dissipation structure used in coordination with a pluggable heat source according to an embodiment of the present application.
Figure 5:
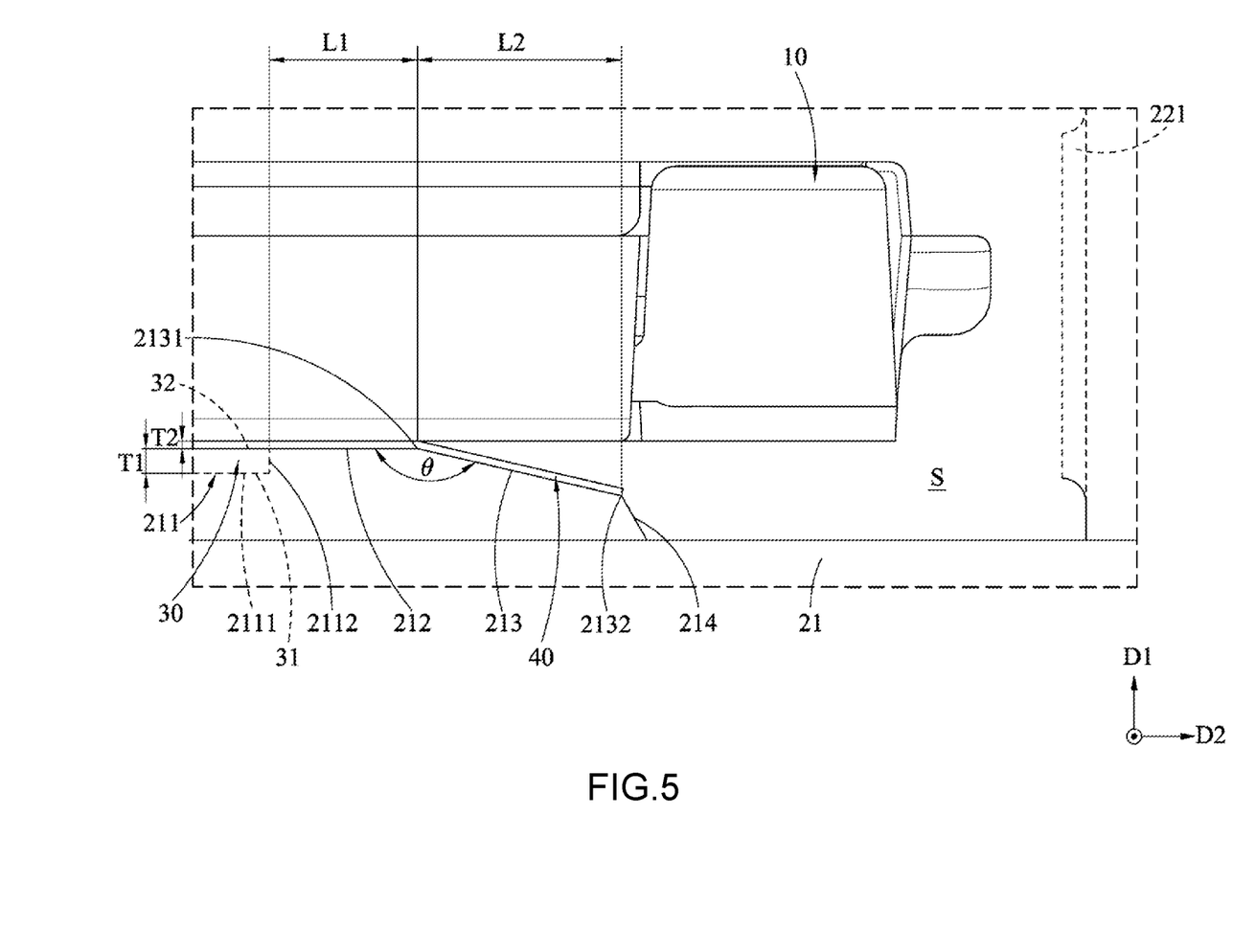
FIG. 5 is an enlarged partial schematic diagram of a circled portion 5 in FIG. 4.
Figure 6:
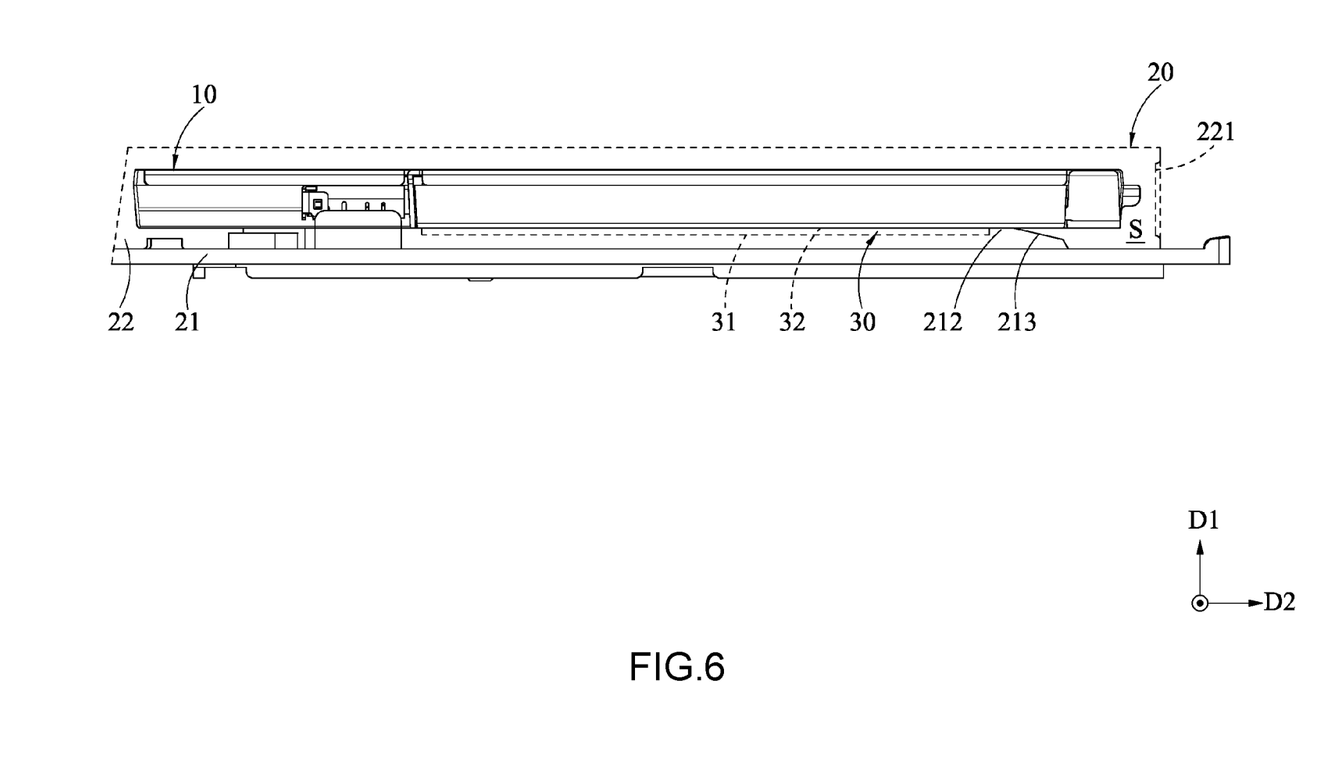
FIG. 6 is a planar assembly structural schematic diagram of a heat dissipation structure used in coordination with a pluggable heat source according to another embodiment of the present application.

Refer to FIG. 1 to FIG. 6. FIG. 1 shows an appearance schematic diagram of an electronic device having a heat dissipation structure according to an embodiment of the present application. FIG. 2 shows a three-dimensional structural schematic diagram of a heat dissipation structure used in coordination with a pluggable heat source according to an embodiment of the present application. FIG. 3 shows an exploded planar structural schematic diagram of a heat dissipation structure used in coordination with a pluggable heat source according to an embodiment of the present application. FIG. 4 shows a planar assembly structural schematic diagram of a heat dissipation structure used in coordination with a pluggable heat source according to an embodiment of the present application. FIG. shows an enlarged partial schematic diagram of a circled portion 5 in FIG. 4. FIG. 6 shows a planar assembly structural schematic diagram of a heat dissipation structure used in coordination with a pluggable heat source according to another embodiment of the present application.

The heat dissipation structure of the present application is for providing a pluggable heat source 10 with good heat dissipation effects. The heat dissipation structure includes a housing 20, a heat conduction sheet 30 and a thin film 40. As shown in FIG. 3, the housing 20 includes a wall surface 21. The wall surface 21 includes an accommodating groove 211, a supporting surface 212 and an inclined surface 213. The accommodating groove 211 is recessed on the supporting surface 212. The inclined surface 213 is connected to the supporting surface 212, and is located on one side of the accommodating groove 211. The heat conduction sheet 30 is accommodated in the accommodating groove 211, and a surface of the heat conduction sheet 30 is in aligned with a surface of the supporting surface 212. The thin film 40 covers the supporting surface 212, the heat conduction sheet 30 and the inclined surface 213.

Thus, the pluggable heat source 10 can directly dissipate heat through the heat conduction sheet 30 after it is placed into the housing 20, hence enhancing heat dissipation effects. The inclined surface 213 on the housing 20 can guide the pluggable heat source 10 to be placed into the housing 20. Moreover, the thin film 40 on the housing 20 can further assist the pluggable heat source 10 to be inserted with minimal effort into the housing 20, and the thin film 40 that extends and covers the inclined surface 213 can further prevent the pluggable heat source 10 from contacting an end portion of the thin film 40 during the plugging/unplugging process, reducing the risks of the thin film 40 being scooped up by the pluggable heat source 10 and enhancing structural stability.

Referring to FIG. 1, in some embodiments, the heat dissipation structure is a part of an electronic device E. In these embodiments, the electronic device E includes a host E1, a heat dissipation structure and the pluggable heat source 10. The heat dissipation structure is arranged on a side surface of the electronic device E, and the pluggable heat source 10 is a pluggable electronic element and can be inserted into the housing 20 of the heat dissipation structure or be removed from the housing 20, depending on requirements. The pluggable heat source 10 is electrically connected to a connection terminal 52 in the electronic device E through a connection terminal 51. The electronic device E is, for example but not limited to, a laptop computer, a tablet computer, a keyboard base, a cellphone or a camera. The pluggable heat source 10 is, for example but not limited to, a pluggable memory, a pluggable hard drive, a television card, or other types of peripheral controller interface (PCI) cards.

Referring to FIG. 1 to FIG. 3, the housing 20 is arranged on one side surface of the host E1 to accommodate the pluggable heat source 10. In some embodiments, the housing 20 includes a wall surface 21 and a sidewall 22. The sidewall 22 is arranged around a periphery of the wall surface 21, and the sidewall 22 and one side of the wall surface 21 jointly define an accommodating space S for insertion of the pluggable heat source 10. In these embodiments, the other side of the wall surface 21 is for connecting to the host E1, and the sidewall 22 has an interface 221 in communication with the accommodating space S for the pluggable heat source 10 to be inserted into the accommodating space S.

Referring to FIG. 3 and FIG. 4, in some embodiments, the accommodating groove 211, the supporting surface 213 and the inclined surface 213 of the wall surface 21 are located on one side of the wall surface 21 facing the accommodating space S. Thus, the heat conduction sheet 30 accommodated in the accommodating space S and the thin film 40 covering the supporting surface 212 are also located on one side of the wall surface 21 facing the accommodating space S. As such, when the pluggable heat source 10 is inserted into the housing 20 through the interface 221, the pluggable heat source 10 can be accommodated in the accommodating space S and be in contact with the heat conduction sheet 30 or the thin film 40. That is to say, the heat dissipation structure of the electronic device E can include the thin film 40 (as shown in FIG. 2 to FIG. 5) or can exclude the thin film 40 (as shown in FIG. 6).

In some embodiments, the accommodating groove 211 has a groove bottom surface 2111 and a groove side surface 2112 arranged around a periphery of the groove bottom surface 2111. In these embodiments, the heat conduction sheet 30 is a sheet structure having an outer shape corresponding to the accommodating groove 211, and has a first surface 31 and a second surface 32 opposite to each other. Thus, when the heat conduction sheet 30 is accommodated in the accommodating groove 211, the first surface 31 of the heat conduction sheet 30 is pressed against the groove bottom surface 2111, the second surface 32 of the heat conduction sheet 30 is aligned with the supporting surface 212, and the periphery of the heat conduction sheet 30 is pressed against the groove side surface 2112 and hence stabilized and limited by the groove side surface 2112. As such, when the pluggable heat source 10 is inserted into the accommodating space S of the housing 10, the pluggable heat source 10 is directly in contact with the second surface 32 (as shown in FIG. 6) of the heat conduction sheet 30, hence achieving heat dissipation effects. Further, when the thin film 40 covers the heat conduction sheet 30, the pluggable heat source 10 is directly in contact with the thin film 40 (as shown in FIG. 4 and FIG. 5), the thin film 40 is directly in contact with the heat conduction sheet 30, and heat energy of the pluggable heat source 10 can be directly transferred to the heat conduction sheet 30 through the thin film 40 covering the supporting surface 212, similarly providing heat dissipation effects. Herein, the heat conduction sheet 30 is a sheet structure having a heat conduction function. In other embodiments, the heat conduction sheet 30 can also be a thermal pad, a thermal grease, a heat pipe or a thermal paste, and is not limited to these examples.

Referring to FIG. 3 to FIG. 5, in some embodiments, a direction perpendicular to the support surface 212 of the housing 20 is a first direction D1, and a direction perpendicular to the first direction D1 is a second direction D2. The inclined surface 213 has a first end 2131 and a second end 2132, wherein the first end 2131 is connected to the supporting surface 212, and the second end 2132 is farther away from the supporting surface 212 than the groove bottom surface 2111 in the first direction D1. The inclined surface 213 can guide the pluggable heat source 10 to be smoothly inserted into the housing 20 in the second direction D2, and be arranged on the supporting surface 212. On the other hand, a length by which the thin film 40 extends out of the supporting surface 212 and covers the inclined surface 213 in the second direction D2 is more than a depth of the accommodating groove 211 in the first direction D1, so as to ensure that the part of the thin film 40 extending out of the supporting surface 212 and covering the inclined surface 213 has a sufficient length in the second direction D2, hence ensuring that the thin film 40 can be stably adhered to the inclined surface 213 even at a turning section of a junction between the supporting surface 212 and the inclined surface 213.

In some embodiments, in the second direction D2, the supporting surface 212 has a first length L1 between the accommodating groove 211 and the inclined surface 213, the inclined surface 213 has a second length L2 between the first end 2131 and the second end 2132, and the second length L2 is more than the first length L1. In these embodiments, the thin film 40 completely covers the inclined surface 213, and an end portion of the thin film 40 extends to the second end 2132 of the inclined surface 213, so as to ensure that the thin film 40 extends out of the supporting surface 212 and covers the inclined surface 213 by a sufficient length, further ensuring the stability of the thin film 40 adhering on the inclined surface 213.

Moreover, referring to FIG. 5, in some embodiments, in the second direction D2, the second end 2132 is closer to the interface 221 than the first end 2131. As such, the inclined surface 213 becomes a form that extends from the second end 2132 toward the interface 221 and away from the supporting surface 212. The plugging/unplugging process of the pluggable heat source 10 is performed while pressing against the thin film 40 on the supporting surface 212, the thin film 40 covers the inclined surface 213, and the end portion of the thin form 40 is kept away from the plugging/unplugging of the pluggable heat source 10 by the inclined form of the inclined surface 213. Thus, the pluggable heat source 40 does not come into contact with the end portion of the thin film 40 during the plugging/unplugging process, and the plugging/unplugging operation of the pluggable heat source 10 does not scoop up the thin film 40, hence ensuring the stability of the thin film 40.

Referring to FIG. 4 and FIG. 5, in some embodiments, to ensure that the heat energy of the pluggable heat source 10 is transferred to the heat conduction sheet 30 through the thin film 40, the heat conduction sheet 30 has a first thickness T1 and the thin film 40 has a second thickness T2 in the first direction D1, wherein the second thickness T2 of the thin film 40 is 10% to 35% of the first thickness T1 of the heat conduction sheet 30. Thus, by setting the thickness of the thin film 40, it is ensured that the heat energy of the pluggable heat source 10 is transferred to the heat conduction sheet 30 through the thin film 40 for heat dissipation.

In some embodiments, to improve the plugging/unplugging smoothness of the pluggable heat source 10 with respect to the housing 20, the thin film 40 with which the pluggable heat source 10 comes into direct contact during the plugging/unplugging operation of the pluggable heat source 10 is made of a material having a lower coefficient of friction. In these embodiments, the coefficient of friction of the thin film 40 is less than the coefficient of friction of the heat conduction sheet 30 and supporting surface 212. More specifically, the thin film 40 is made of polyethylene (PE) or polytetrafluoroethylene (PTFE); it should be noted that the present application is not limited to the above examples.

Referring to FIG. 3 to FIG. 5, in some embodiments, to further prolong the life cycle of the thin film 40, a connecting angle $\theta$ is located at the first end 2131 between the supporting surface 212 and the inclined surface 213. In these embodiments, the connecting angle $\theta$ is an obtuse angle. Thus, when the thin film 40 covers the supporting surface 212 and extends to cover the inclined surface 213, because the thin film 40 necessarily covers the obtuse angle $\theta$, the obtuse connecting angle $\theta$ is capable of preventing from contacting the thin film 40 with a sharp angle, as well as minimizing possible damage of the thin film 40 caused by the connecting angle $\theta$ during the plugging/unplugging process of the pluggable heat source 10, hence prolonging the life cycle of the thin film 40.

Referring to FIG. 3 to FIG. 5, in some embodiments, the wall surface 21 further includes an extension surface 214. The extension surface 214 is connected to the second end 2132 of the inclined surface 213, and a slope of the extension surface 214 is more than a slope of the inclined surface 213 In these embodiments, the end portion of the thin film 40 extends to the second end 2132 of the inclined surface 213. Since the second end 2132 of the inclined surface 213 is connected to the extension surface 214, not only the thin film 40 can extend to the second end 2132 of the inclined surface 213, the thin film 40 having a longer length can also further extend to be adhered to the inclined surface 214 instead of being incapable of adhesion due to an insufficient length. Thus, the end portion of the thin film 40 is effectively prevented from lifting and hence from affecting the stability of the thin film 40, and the thin film 40 is also provided a length tolerance to reduce manufacturing difficulties.

The present disclosure is disclosed as the embodiments above. However, these embodiments are not to be construed as limitation to the present disclosure. Slight modifications and variations may be made by a person skilled in the art without departing from the spirit and scope of the present disclosure. Therefore, the scope of protection of the present application should be accorded with the broadest interpretation of the appended claims.

What is claimed is:

1. A heat dissipation structure, comprising:
   a housing, comprising a wall surface, the wall surface comprising an accommodating groove, a supporting surface and an inclined surface, the accommodating groove recessed on the supporting surface, and the inclined surface connected to the supporting surface and located on one side of the accommodating groove;
   a heat conduction sheet, accommodated in the accommodating groove, wherein a surface of the heat conduction sheet is in aligned with a surface of the supporting surface; and
   a thin film, covering the supporting surface, the heat conduction sheet and the inclined surface;
   wherein the wall surface further comprises an extension surface connected to the inclined surface, and a slope of the extension surface is more than a slope of the inclined surface.

2. The heat dissipation structure according to claim 1, wherein the heat conduction sheet has a first thickness, the thin film has a second thickness, and the second thickness is 10% to 35% of the first thickness.

3. The heat dissipation structure according to claim 1, wherein a coefficient of friction of the thin film is less than a coefficient of friction of the heat conduction sheet.

4. The heat dissipation structure according to claim 1, wherein a coefficient of friction of the thin film is less than a coefficient of friction of the supporting surface.

5. The heat dissipation structure according to claim 1, wherein the thin film is made of polyethylene (PE) or polytetrafluoroethylene (PTFE).

6. The heat dissipation structure according to claim 1, wherein a direction perpendicular to the supporting surface is a first direction, the accommodating groove has a groove bottom surface, the inclined surface has a first end and a second end, the first end is connected to the support surface, and the second end is farther away from the support surface than the groove bottom surface in the first direction.

7. The heat dissipation structure according to claim 6, wherein the housing further has an interface, and the second end of the inclined surface is closer to the interface than the first end.

8. The heat dissipation structure according to claim 6, wherein a direction perpendicular to the first direction is a second direction, the supporting surface has a first length between the accommodating groove and the inclined surface in the second direction, the inclined surface has a second length between the first end and the second end, and the second length is more than the first length.

9. The heat dissipation structure according to claim 6, wherein a connecting angle is located at the first end between the supporting surface and the inclined surface, and the connecting angle is an obtuse angle.

10. An electronic device, comprising:
    a housing, comprising a wall surface, the wall surface comprising an accommodating groove, a supporting surface and an inclined surface, the accommodating groove recessed on the supporting surface, and the inclined surface connected to the supporting surface and located on one side of the accommodating groove;
    a heat conduction sheet, accommodated in the accommodating groove, wherein a surface of the heat conduction sheet is in aligned with a surface of the supporting surface;
    a thin film, covering the supporting surface, the heat conduction sheet and the inclined surface; and
    a pluggable heat source, arranged on the thin film;
    wherein the wall surface further comprises an extension surface connected to the inclined surface, and a slope of the extension surface is more than a slope of the inclined surface.

11. The electronic device according to claim 10, wherein the housing further has an interface, and the pluggable heat source is slidably arranged in the housing through the interface.

12. The electronic device according to claim 10, further comprising a host, wherein the housing is arranged on a side surface of the host.

13. A heat dissipation structure, comprising:
    a housing, comprising a wall surface, the wall surface comprising an accommodating groove, a supporting surface and an inclined surface, the accommodating groove recessed on the supporting surface, and the inclined surface connected to the supporting surface and located on one side of the accommodating groove;
    a heat conduction sheet, accommodated in the accommodating groove, wherein a surface of the heat conduction sheet is in aligned with a surface of the supporting surface; and
    a thin film, covering the supporting surface, the heat conduction sheet and the inclined surface;
    wherein the inclined surface and the accommodating groove are separated from each other by a part of the supporting surface.

14. The heat dissipation structure according to claim 13, wherein the heat conduction sheet has a first thickness, the thin film has a second thickness, and the second thickness is 10% to 35% of the first thickness.

15. The heat dissipation structure according to claim 13, wherein a coefficient of friction of the thin film is less than a coefficient of friction of the heat conduction sheet.

16. The heat dissipation structure according to claim 13, wherein a coefficient of friction of the thin film is less than a coefficient of friction of the supporting surface.

17. The heat dissipation structure according to claim 13, wherein the thin film is made of polyethylene (PE) or polytetrafluoroethylene (PTFE).

18. The heat dissipation structure according to claim 13, wherein a direction perpendicular to the supporting surface is a first direction, the accommodating groove has a groove bottom surface, the inclined surface has a first end and a second end, the first end is connected to the support surface, and the second end is farther away from the support surface than the groove bottom surface in the first direction.

19. The heat dissipation structure according to claim 18, wherein the housing further has an interface, and the second end of the inclined surface is closer to the interface than the first end.

20. The heat dissipation structure according to claim 18, wherein a direction perpendicular to the first direction is a second direction, the supporting surface has a first length between the accommodating groove and the inclined surface in the second direction, the inclined surface has a second length between the first end and the second end, and the second length is more than the first length.

* * * * *